United States Patent
Coss, Jr. et al.

(10) Patent No.: US 6,594,589 B1
(45) Date of Patent: Jul. 15, 2003

(54) METHOD AND APPARATUS FOR MONITORING TOOL HEALTH

(75) Inventors: Elfido Coss, Jr., Austin, TX (US); Richard J. Markle, Austin, TX (US); Patrick M. Cowan, Pflugerville, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 118 days.

(21) Appl. No.: 09/863,822

(22) Filed: May 23, 2001

(51) Int. Cl.⁷ .............................. G01B 3/44; G01B 3/52; G06F 19/00
(52) U.S. Cl. ............................................. 702/34; 702/36
(58) Field of Search ........................... 702/34, 36, 134, 702/179; 73/865.9; 340/680; 700/173; 318/565

(56) References Cited

U.S. PATENT DOCUMENTS

| | | | | |
|---|---|---|---|---|
| 3,819,916 A | * | 6/1974 | Watanabe | 318/565 |
| 4,509,126 A | * | 4/1985 | Olig et al. | 700/173 |
| 4,558,311 A | * | 12/1985 | Forsgren et al. | 340/680 |
| 4,559,600 A | * | 12/1985 | Rao | 700/175 |
| 4,757,307 A | * | 7/1988 | Keramati et al. | 340/680 |
| 4,894,644 A | * | 1/1990 | Thomas | 340/680 |
| 5,587,931 A | * | 12/1996 | Jones et al. | 702/34 |
| 5,857,166 A | * | 1/1999 | Kim | 702/179 |
| 5,940,787 A | * | 8/1999 | Gelston | 702/134 |
| 6,006,163 A | * | 12/1999 | Lichtenwalner et al. | 702/36 |
| 6,260,427 B1 | * | 7/2001 | Jones et al. | 73/865.9 |
| 6,308,138 B1 | * | 10/2001 | Jones et al. | 702/34 |

* cited by examiner

*Primary Examiner*—Bryan Bui
*Assistant Examiner*—Aditya Bhat
(74) *Attorney, Agent, or Firm*—Williams, Morgan & Amerson, P.C.

(57) ABSTRACT

A method for monitoring health of a tool includes receiving at least one tool parameter related to the processing of a workpiece in a tool; receiving a model selection trigger; selecting a tool health model based on the model selection trigger; generating at least one predicted tool parameter based on the selected tool health model; and generating a tool health rating for the tool based on a comparison between the measured tool parameter and the predicted tool parameter. A tool health monitor includes a library of tool health models, a model selector, and a fault detection and classification unit. The model selector is adapted to receive a model selection trigger and select a tool health model based on the model selection trigger. The fault detection and classification unit is adapted to receive at least one tool parameter related to the processing of a workpiece in a tool, generate at least one predicted tool parameter based on the selected tool health model, and generate a tool health rating for the tool based on a comparison between the received tool parameter and the predicted tool parameter.

51 Claims, 4 Drawing Sheets

METHOD AND APPARATUS FOR MONITORING TOOL HEALTH

BACKGROUND OF THE INVENTION

1. Field of the Invention

This invention relates generally to semiconductor device manufacturing and, more particularly, to a method and apparatus for monitoring tool health.

2. Description of the Related Art

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in a continual improvement in the manufacture of semiconductor devices, e.g., transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

Generally, a set of processing steps is performed on a lot of wafers using a variety of processing tools, including photolithography steppers, etch tools, deposition tools, polishing tools, rapid thermal processing tools, implantation tools, etc. The technologies underlying semiconductor processing tools have attracted increased attention over the last several years, resulting in substantial refinements. However, despite the advances made in this area, many of the processing tools that are currently commercially available suffer certain deficiencies. In particular, such tools often lack advanced process data monitoring capabilities, such as the ability to provide historical parametric data in a user-friendly format, as well as event logging, real-time graphical display of both current processing parameters and the processing parameters of the entire run, and remote, i.e., local site and worldwide, monitoring. These deficiencies can engender nonoptimal control of critical processing parameters, such as throughput, accuracy, stability and repeatability, processing temperatures, mechanical tool parameters, and the like. This variability manifests itself as within-run disparities, run-to-run disparities and tool-to-tool disparities that can propagate into deviations in product quality and performance, whereas an ideal monitoring and diagnostics system for such tools would provide a means of monitoring this variability, as well as providing means for optimizing control of critical parameters.

One technique for improving the operation of a semiconductor processing line includes using a factory wide control system to automatically control the operation of the various processing tools. The manufacturing tools communicate with a manufacturing framework or a network of processing modules. Each manufacturing tool is generally connected to an equipment interface. The equipment interface is connected to a machine interface that facilitates communications between the manufacturing tool and the manufacturing framework. The machine interface can generally be part of an advanced process control (APC) system. The APC system initiates a control script based upon a manufacturing model, which can be a software program that automatically retrieves the data needed to execute a manufacturing process. Often, semiconductor devices are staged through multiple manufacturing tools for multiple processes, generating data relating to the quality of the processed semiconductor devices.

Various tools in the processing line are controlled in accordance with performance models to reduce processing variation. Commonly controlled tools include photolithography steppers, polishing tools, etching tools, annealing tools, and deposition tools. Pre-processing and/or post-processing metrology data is supplied to process controllers for the tools. Operating recipe parameters, such as processing time, are calculated by the process controllers based on the performance model and the metrology information to attempt to achieve post-polishing results as close to a target value as possible. Reducing variation in this manner leads to increased throughput, reduced cost, higher device performance, etc., all of which equate to increased profitability.

One technique for monitoring the operation of a particular tool involves employing a multivariate tool health model adapted to predict the expected operating parameters of the tool during the processing of wafers in the tool. If the actual tool parameters are close to the predicted tool parameters, the tool is said to have a high health rating (i.e., the tool is operating as expected). As the gap between the expected tool parameters and the actual tool parameters widens, the tool health rating decreases. If the tool health rating falls below a predetermined threshold, a maintenance procedure may be performed to troubleshoot or repair the tool. If the tool health is sufficiently low, the wafers processed by the tool in the degraded condition may be flagged as suspect or reworked.

Typically, the model used to predict the operating parameters of the tool, thereby measuring the health of the tool, is based on the particular tool and the base operating recipe employed by the tool for processing the wafers. Hence, each tool has a separate tool health model for each of the base operating recipes run on the tool. An exemplary tool health monitor software application is ModelWare™ offered by Triant, Inc. of Nanaimo, British Columbia, Canada Vancouver, Canada.

Commonly, a tool undergoes periodic preventative maintenance procedures or calibrations to keep the tool in optimum operating condition. For example, polishing tools include polishing pads that are periodically conditioned or replaced. Etch tools, annealing tools, and deposition tools are periodically cleaned using both in-situ cleaning processes or complete disassembly cleaning processes. Steppers are periodically calibrated to maintain alignment accuracy and exposure dose consistency. The discrete maintenance activities, collectively referred to as tool events, often cause step changes in the processing characteristics of the tool.

Other types of events experienced by the tool cause incremental changes to the operating characteristics of the tool. For example, certain parameters in an operating recipe of the tool may be controlled by a process controller based on metrology data to reduce variation in an output characteristic of the wafers processed in the tool (e.g., thickness of a process layer deposited in deposition tool or critical dimension of a photoresist pattern exposed in a stepper). Although the actual operating recipe used by the tool is periodically changed by the process controller, the base operating recipe, in the eyes of the manufacturing control system, remains the same.

Yet another source of variation in the operating characteristics of a tool results from degradation of consumable items used in the tool. For example, polishing pads degrade over time in a polishing tool, the intensity of a lamp used to expose photoresist layers in a stepper degrades over time, and byproducts build up in a deposition chamber over time increasing the amount of particle contamination.

The effectiveness of the multivariate fault detection technique described above depends on how accurately the tool model matches the actual operating conditions of the tool. If the tool health model does not accurately reflect the actual operating conditions of the tool, the tool parameters predicted by the model will diverge from the actual tool parameters measured during the processing run. A degraded tool health measurement may be indicated based on a failure of the tool health monitor as opposed to an actual degraded condition of the tool. As a result, the tolerances used by the tool health monitor for diagnosing a degraded tool condition must be set such that the likelihood of giving a false degraded health indication is reduced. Necessarily, this reduces the sensitivity of the tool health monitor and causes an increase in the number of tool health problems that are undiagnosed.

The present invention is directed to overcoming, or at least reducing the effects of, one or more of the problems set forth above.

SUMMARY OF THE INVENTION

One aspect of the present invention is seen in a method for monitoring health of a tool. The method includes receiving at least one tool parameter related to the processing of a workpiece in a tool; receiving a model selection trigger; selecting a tool health model based on the model selection trigger; generating at least one predicted tool parameter based on the selected tool health model; and generating a tool health rating for the tool based on a comparison between the measured tool parameter and the predicted tool parameter.

Another aspect of the present invention is seen in a tool health monitor including a library of tool health models, a model selector, and a fault detection and classification unit. The model selector is adapted to receive a model selection trigger and select a tool health model based on the model selection trigger. The fault detection and classification unit is adapted to receive at least one tool parameter related to the processing of a workpiece in a tool, generate at least one predicted tool parameter based on the selected tool health model, and generate a tool health rating for the tool based on a comparison between the received tool parameter and the predicted tool parameter.

BRIEF DESCRIPTION OF THE DRAWINGS

The invention may be understood by reference to the following description taken in conjunction with the accompanying drawings, in which like reference numerals identify like elements, and in which.

Figure 1:
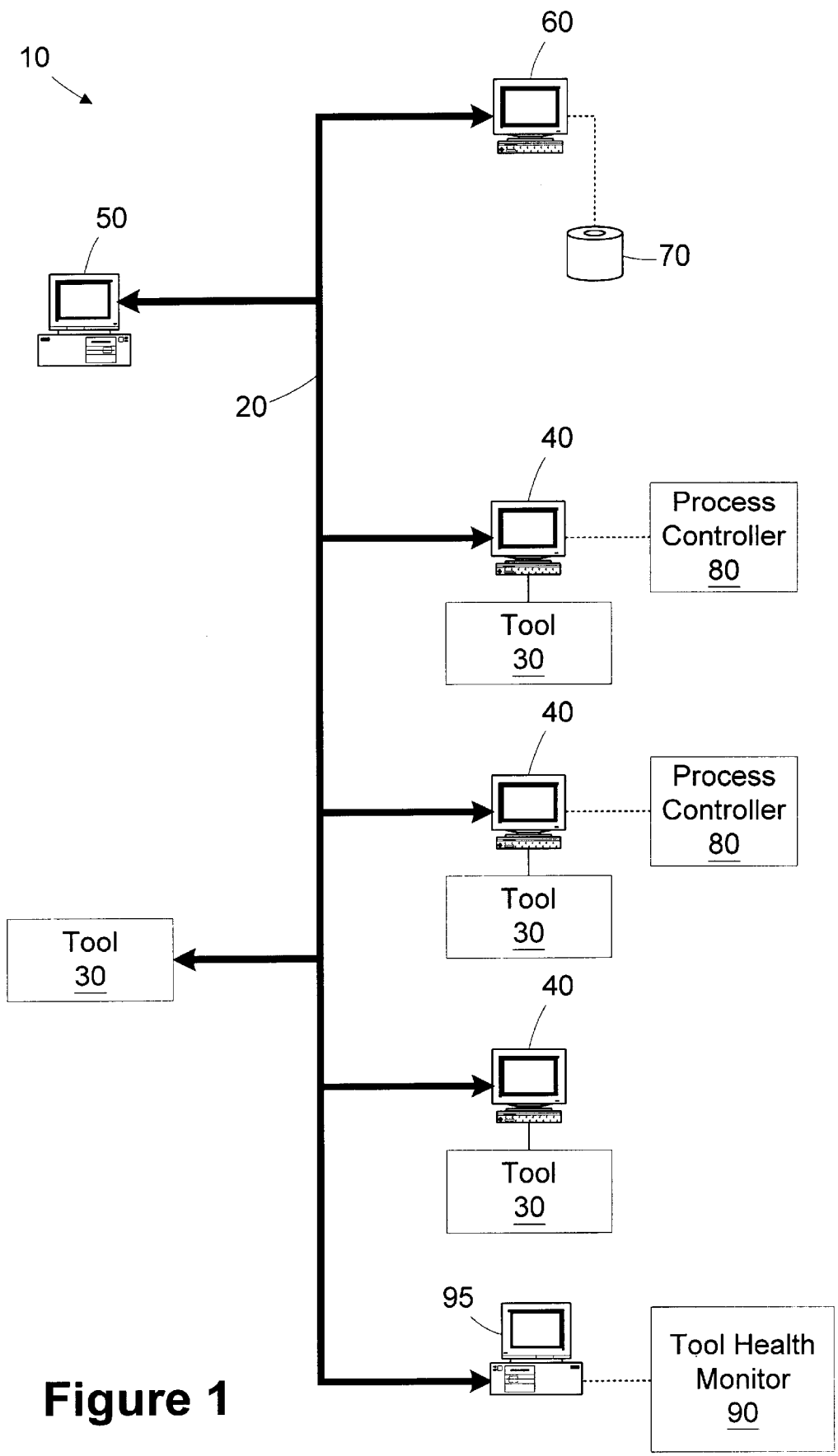
FIG. 1 is a simplified block diagram of an illustrative manufacturing system in accordance with one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

In general, the present invention is directed to a system and method for monitoring tool health. In particular, the present invention is directed to monitoring tool health using a plurality of tool health models, one of which is selected for monitoring the health of the tool based on a model selection trigger.

As will be readily apparent to those skilled in the art upon a complete reading of the present application, the present method is applicable to a variety of technologies, e.g., NMOS, PMOS, CMOS, etc., and it is readily applicable to a variety of devices, including, but not limited to, logic devices, memory devices, etc. The present invention is also applicable to other manufacturing environments other than semiconductor device fabrication.

Referring to FIG. 1, a simplified block diagram of an illustrative manufacturing system 10 is provided. In the illustrated embodiment, the manufacturing system 10 is adapted to process semiconductor wafers, however, the invention is not so limited and may be applied to other types of manufacturing environments and other types of workpieces. A network 20 interconnects various components of the manufacturing system, allowing them to exchange information. The illustrative manufacturing system 10 includes a plurality of tools 30, each being coupled to a computer 40 for interfacing with the network 20. Alternatively, the tool 30 may include an integrated computer (not shown) adapted to interface with the network 20. A process control server 50 directs the high level operation of the manufacturing system 10 by directing the process flow of the manufacturing system 10. The process control server 50 monitors the status of the various entities in the manufacturing system, including the tools 30. The tools 30 may be processing tools, such as photolithography steppers, etch tools, deposition tools, polishing tools, rapid thermal processing (RTP) tools, implantation tools, etc., or metrology tools for measuring characteristics of the wafers being processed in the manufacturing system 10. A database server 60 is provided for storing data related to the status of the various entities and workpieces (e.g., wafers) in the process flow. The database server 60 may store information in one or more data stores 70. The data may include pre-process and post-process metrology data, tool states, process flow activities (e.g., scheduled maintenance events, processing routes for lots of wafers), etc. The distribution of the processing and data storage functions amongst the different computers 40, 50, 60 is generally conducted to provide independence and a central information store. Of course, more or fewer computers may be used.

An exemplary information exchange and process control framework suitable for use in the manufacturing system 10 is an Advanced Process Control (APC) framework, such as may be implemented using the Catalyst system offered by KLA-Tencor, Inc. The Catalyst system uses Semiconductor Equipment and Materials International (SEMI) Computer Integrated Manufacturing (CIM) Framework compliant system technologies and is based the Advanced Process Control (APC) Framework. CIM (SEMI E81-0699—Provisional specification for CIM Framework Domain Architecture) and APC (SEMI E93-0999—Provisional Specification for CIM Framework Advanced Process Control Component) specifications are publicly available from SEMI.

Portions of the invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Some of the tools 30 include process controllers 80 that are adapted to automatically control the operating recipes of their respective tools 30. A particular tool 30 may have more than one process controller 80 adapted to control more than one operating recipe parameter. For example, if the tool 30 is a CMP tool, the process controller 80 may receive pre-polish thickness measurements (e.g., thickness of high features, thickness of low features) and predict a polishing time required to achieve a post-polish target thickness. In the case where the tool 30 is a photolithography tool, the process controller 80 may model the exposure time or dose based on post-exposure measurements of the develop inspect critical dimension (DICD) of the photoresist layer. The process controller 80 may use a control model of the tool 30 to generate its prediction. The control model may be developed empirically using commonly known linear or non-linear techniques. The control model may be a relatively simple equation based model (e.g., linear, exponential, weighted average, etc.) or a more complex model, such as a neural network model, principal component analysis (PCA) model, or a projection to latent structures (PLS) model. The specific implementation of the model may vary depending on the modeling technique selected. Using the control model, the process controller 80 may determine operating recipe parameters to reduce post-process variations.

The manufacturing system 10 also includes a tool health monitor 90 operating on a workstation 95 for monitoring the health of selected tools 30. The operation of the tool health monitor 90 is described in greater detail below in reference to FIGS. 2 and 3. For purposes of illustration, the operation of tool health monitor 90 is described as it may be implemented for monitoring the health of a rapid thermal processing (RTP) tool. Of course, the tool health monitor 90 may also be adapted to monitor the health of many other types of tools, including processing tools or metrology tools.

Generally, rapid thermal processing (RTP) comprises quickly increasing the temperature of at least a portion of a wafer or of a process layer formed thereon for short periods of time. For example, rapid thermal processing is used to thermally anneal the wafer after an ion implantation process. During ion implantation, the surface of the wafer is bombarded with either N or P type dopant atoms, and as a result of the implantation, the crystal lattice of the semiconductor wafer may become damaged. The anneal step utilizes rapid thermal processing to recrystallize the silicon. The wafer may be annealed by quickly ramping up to a desired processing temperature, holding the processing temperature for a desired period of time, and cooling the wafer back to room temperature in a relatively short period of time. Although exact temperatures and times may vary depending upon the particular annealing process, the wafer may be heated to approximately 1000° C. for 5 to 30 seconds.

Figure 2:
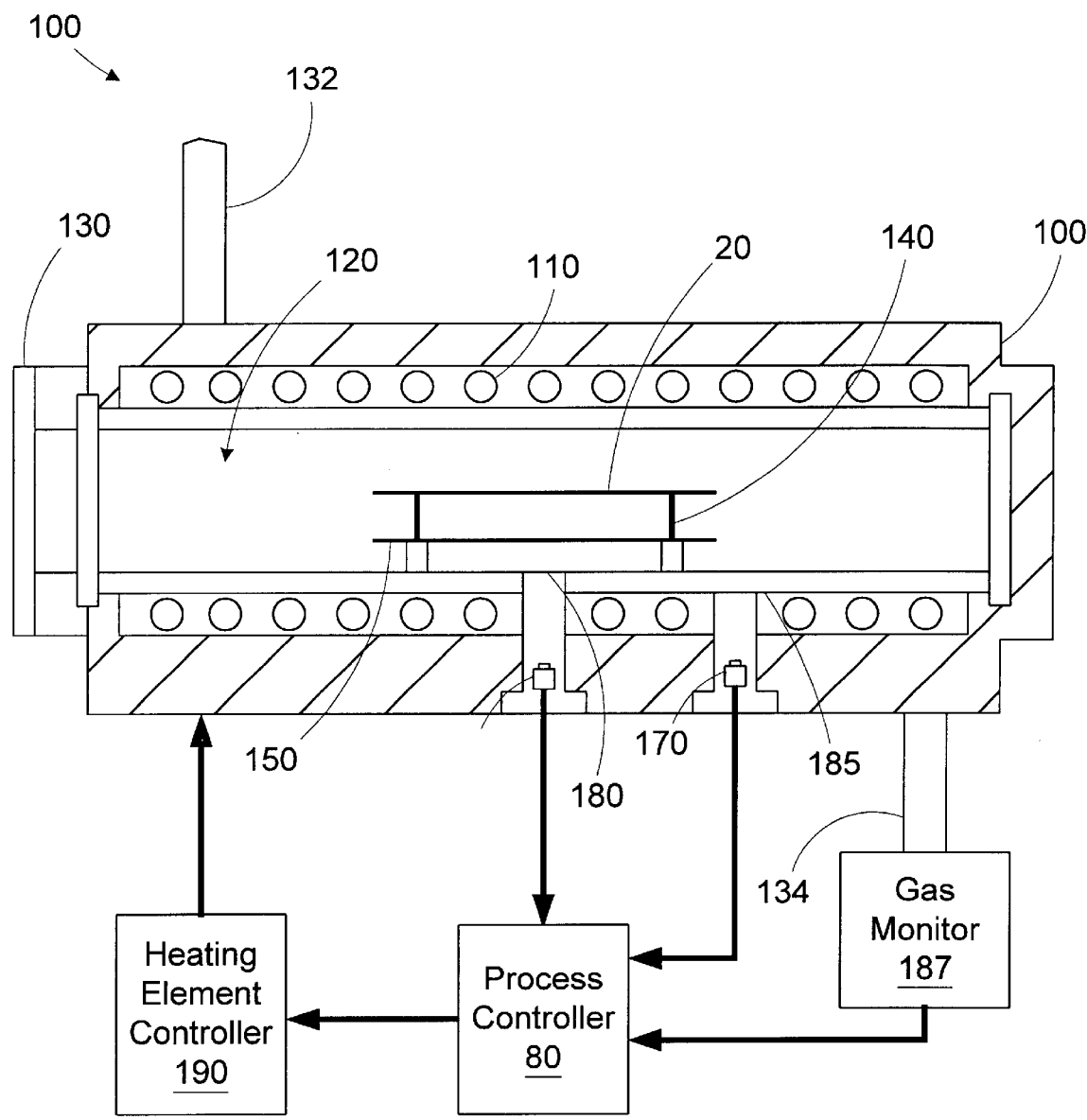
FIG. 2 is a cross-sectional view of an illustrative rapid thermal processing (RTP) tool in the manufacturing system of FIG. 1.

Turning now to FIG. 2, a cross-sectional view of an exemplary embodiment of an RTP tool 100 is shown. A commercially available tool similar to the illustrated embodiment is an SHS 2800 manufactured by AST Elektronik. A variety of tool parameters of the RTP tool 100 may be monitored to determine the current state of the RTP tool 100. Moreover, a variety of sensors and devices may be used to extract the tool parameters. The tool parameters may be sent to the tool health monitor 90 for evaluating the health of the RTP tool 100. Alternatively, the tool parameters may be stored in the data stores 70 and retrieved by the tool health monitor 90 for analysis.

The RTP tool 100 includes a reactor block 105, heating elements 110, a reactor chamber 120, and a reactor chamber door 130. A process gas supply line 132 and an exhaust line 134 are provided for controlling the processing environment of the reactor chamber 120. The heating elements 110 may be positioned adjacent the reactor block 105 and may be comprised of a variety of devices, such as tungsten halogen lamps. The heating elements 110 provide heat to the reactor chamber 120. Each heating element 110 may be independently and dynamically controlled to provide uniform and precise heating to the wafer using radiation that passes through the reaction chamber 120.

The reactor chamber 120 separates the wafer from the heating elements 110 and the reactor block 105, thus, providing a tightly controlled processing environment while minimizing the amount of contamination to which the wafer is exposed. The reactor chamber 120 may be accessed through the reactor chamber door 130. Each wafer in a lot may be individually loaded into the RTP tool 100 and extracted, after processing, through the reactor chamber door 130. The wafer is positioned on quartz pins 140 attached to a quartz wafer tray (not shown), which resides inside the reactor chamber 120. A permanent wafer 150 may be positioned beneath the wafer. The permanent wafer 150 may be a HotLiner®, which is a silicon nitride coated silicon wafer. The permanent wafer 150 helps ensure that the temperature of the wafer is measured accurately.

In one illustrative embodiment, first and second pyrometers 160, 170 are positioned within or near the reactor block 105. The first pyrometer 160 measures the temperature of the wafer or the permanent wafer 150, and the second pyrometer 170 measures the temperature of the reactor chamber 120. Those skilled in the art will appreciate that the pyrometers 160, 170 are non-intrusive measuring devices that do not contact the wafer or the reactor chamber 120. Rather, the pyrometers 160, 170 are optical instruments that measure temperature by light input. Once calibrated, the pyrometers 160, 170 deliver an electrical signal that correlates light intensity with the temperature of the object the pyrometers 160, 170 view.

The first pyrometer 160 measures the temperature of the wafer through a window 180. The window 180 permits the first pyrometer 160 to "look" into the reactor chamber 120 and determine the temperature of the wafer based on the temperature of the permanent wafer 150. If the permanent wafer 150 were not used, the first pyrometer 160 may give false temperature measurements, because the characteristics of the back side film layer of the wafer may vary. The various film layers each give off different emissions in response to temperature. Because the coating of the permanent wafer 150 remains the same, the first pyrometer 160 may be calibrated based on its emitted radiation. The second pyrometer 170 operates in substantially the same manner as the first pyrometer 160, but operates to measure the temperature of the reactor chamber 120. The second pyrometer 170 is directed at the outer surface 185 of the reactor chamber 120.

Although only two pyrometers 160, 170 are shown, those skilled in the art will appreciate that a plurality of pyrometers 160, 170 may be used to determine the temperature of the wafer and reactor chamber 120. Moreover, rather than using the pyrometers 160, 170, a different measuring device, such as a thermocouple, may be used. The number and particular type of measuring devices may vary, depending upon the application.

In the illustrated embodiment, a heating element controller 190 drives the heating elements 110 during operation of the RTP tool 100. Generally, for a particular process, a specific operating temperature may be desired. The process controller 80 may receive temperature measurements (e.g., tool parameters) from the first and second pyrometers 160, 170. Based on the tool parameters, the process controller 80 may direct the heating element controller 190 to increase or decrease the power supplied to the heating elements 110. For example, if the temperature inside the reactor chamber 120 needs to be increased, more power may be supplied to the heating elements 110. Likewise, if the temperature inside the reactor chamber 120 needs to be decreased, the power supplied to heating elements 110 may be reduced.

In one embodiment, the power consumption of the heating elements 110 may be monitored by the process controller 80 and included in the tool parameters of the RTP tool 100. For example, when power is supplied to the heating elements 110 (e.g., during pre-heat, normal operation, etc.), the process controller 80 may determine whether the RTP tool 100 is operating at 50%, 75%, or any other percentage of full power. Alternatively, the process controller 80 may monitor power consumption of the RTP tool 100 in terms of Watts. In one embodiment, during operation of the RTP tool 100, the power consumption of heating elements 110 may be sent to a data output device (not shown), such as a display, a data file, or the like.

In addition to power consumption, the tool state data may include incremental changes, such as increases or decreases in the power supplied to the heating elements 110. As described above, to maintain a desired operating temperature, the process controller 80 may direct the heating element controller 190 to increase or decrease the power supplied to the heating elements 110. These incremental changes may be monitored by the process controller 80 and included in the tool parameters of the RTP tool 100.

A gas monitor 187 may be provided for monitoring the composition and/or pressure of the process gas being exhausted from the reactor chamber 120 in the exhaust line 134 as it exits the RTP tool 100. For example, the oxygen concentration level of the process gas may be monitored using optical emission spectroscopy. Once measured, the exhaust gas data may be received by the process controller 80 and included in the tool parameters of the RTP tool 100.

Typically, the tool parameters described above are collected for use in controlling and/or qualifying the RTP tool 100. One such application of the tool parameters is illustrated in U.S. patent application, Ser. No. 09/479,403, entitled "WAFER-LESS QUALIFICATION OF A PROCESSING TOOL", filed in the names of Terrence J. Riley, Qingsu Wang, Michael R. Conboy, Michael L. Miller, and William Jarrett Campbell, and incorporated herein by reference in its entirety.

Figure 3:
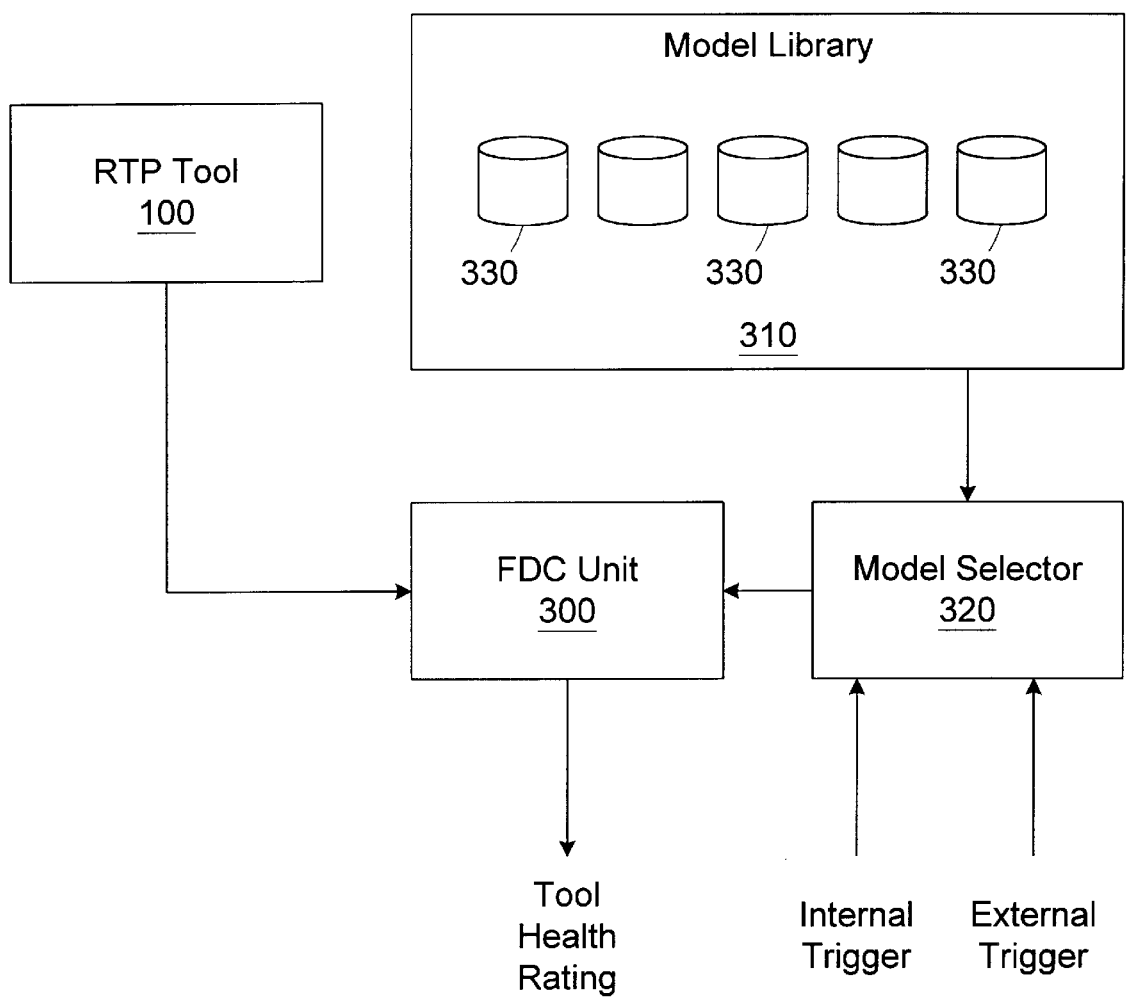
FIG. 3 is a simplified diagram of a tool health monitor adapted to monitor the RTP tool of FIG. 2.

Turning now to FIG. 3, a simplified block diagram of the tool health monitor 90 interfacing with the RTP tool 100 is shown. The tool health monitor 90 includes a fault detection and classification (FDC) unit 300, a model library 310, and a model selector 320. In the illustrated embodiment, the FDC unit 300 may be implemented using the ModelWare software application offered by Triant, Inc. of Vancouver, Canada.

The model selector 320 is adapted to receive a plurality of model selection triggers. The model selection triggers may include internal model selection triggers generated based on the tool parameters or external model selection triggers generated based on external events that affect the operating characteristics of the RTP tool 100.

The model library 310 includes a plurality of tool health models 330. Each tool health model 330 is adapted to a particular set of expected operating conditions. The model selector 320 selects the particular tool health model 330 based on the operating conditions indicated by the model selection triggers.

The FDC unit 300 uses the particular tool health model 330 selected by the model selector 320 for assessing the health of the RTP tool 100 based on the tool parameters collected for the current processing run. The FDC unit 300 outputs a tool health rating for the RTP tool 100. In the illustrated embodiment, the tool health rating is provided as a percentage reflecting the closeness between the predicted tool parameters and the actual tool parameters (i.e., a 100% tool health rating represents a perfect match).

The particular specialization for each tool health model 330 depends on the types of internal and external model selection triggers employed. Certain tool health models may be adapted to handle step changes in the operating characteristics, while others may be adapted to handle incremental changes in the operating characteristics. Individual tool health models 330 may be developed using data stored in the data stores 70 related to the processing of wafers in the RTP tool 100 under similar operating characteristics as the tool health model 330 is expected to cover. Particular techniques for training the tool health models 330 are well known to those of ordinary skill in the art, so they are not described in grater detail herein for clarity and so as to not obscure the present invention.

Exemplary external model selection triggers include maintenance event triggers, APC control event triggers, operator triggers, and/or external sensor triggers. A maintenance event trigger may be generated when a cleaning procedure is performed on the RTP tool 100 or a part, such as a heating element 110, is replaced. Such maintenance events tend to cause a step change in the operating characteristics of the RTP tool 100. The model selector 320 selects a different tool health model 330 that better predicts the tool parameters after such a maintenance event has occurred. An APC control event trigger may be generated in response to an automatic control action of the process controller 80 that affects the operating recipe of the RTP tool 100. Such an automatic control action does not change the base recipe of the RTP tool 100, as seen by the process control server 50, but nevertheless, the change may alter the operating characteristics sufficiently to warrant selection of a different tool health model 330 by the model selector 320. An operator trigger may be provided to allow an operator of the RTP tool 100 to manually select a particular tool health model 330.

An external sensor trigger may be used by the model selector 320 to select a particular tool health model 330 based on some external sensed condition. Although no external sensors are illustrated on the RTP tool 100, an exemplary external signal trigger my be described as it applies to an implant chamber.

Typical implant chambers employ a high voltage electric field for accelerating dopant ions to be implanted (e.g., in the substrate of the wafer to define source/drain regions of a transistor). The magnitude of the electric field is sufficiently high that electrical arcs may form between the field and internal surface of the chamber. The external sensor may be an arc monitor adapted to monitor such arcing in the implant chamber. If the frequency of the arcing is sufficiently high, the effectiveness of the implant process may be affected. The model selector 320 may select different tool health models 330 based on the level and/or frequency of arcing measured by the external sensor.

Exemplary internal model selection triggers include model age triggers, wafer count triggers, tool parameter triggers, and tool setup triggers. A model age trigger may be related to the period of time since the tool health model 330 was last trained with recent data collected regarding the operation of the RTP tool 100. In response to the model age trigger, the model selector 320 may select a more recent tool health model 300 or request (e.g., to an operator or a separate software application) that the recent data be retrieved from the data stores 70 and incorporated into the tool health model 330. A wafer count trigger may be based on the number of wafers or lots of wafers processed in the RTP tool 100. The model selector 320 may change tool health models 330 based on the number of wafers processed to account for expected degradation of consumable items employed in the RTP tool 100 (e.g., heating element 110) or from expected byproduct buildup in the RTP tool 100.

A tool parameter trigger may be invoked when a particular tool parameter exceeds a predetermined threshold. For example, the model selector 320 may select a different tool health model 330 if the total power parameter exceeds a threshold. The new model may model the components of power, current and voltage. A tool setup trigger may be invoked when an initial setup of the RTP tool 100 is manually or automatically performed. For example, if the operating recipe of the RTP tool 100 is changed, the model selector 320 may select a new subset of tool health models 330. Based on previous knowledge of the operating characteristics, such as wafer count or time elapsed since a maintenance event, the model selector 320 may select an appropriate tool health model 330 for the new recipe that accounts for the existing operating characteristics not inherently affected by the recipe change.

Figure 4:
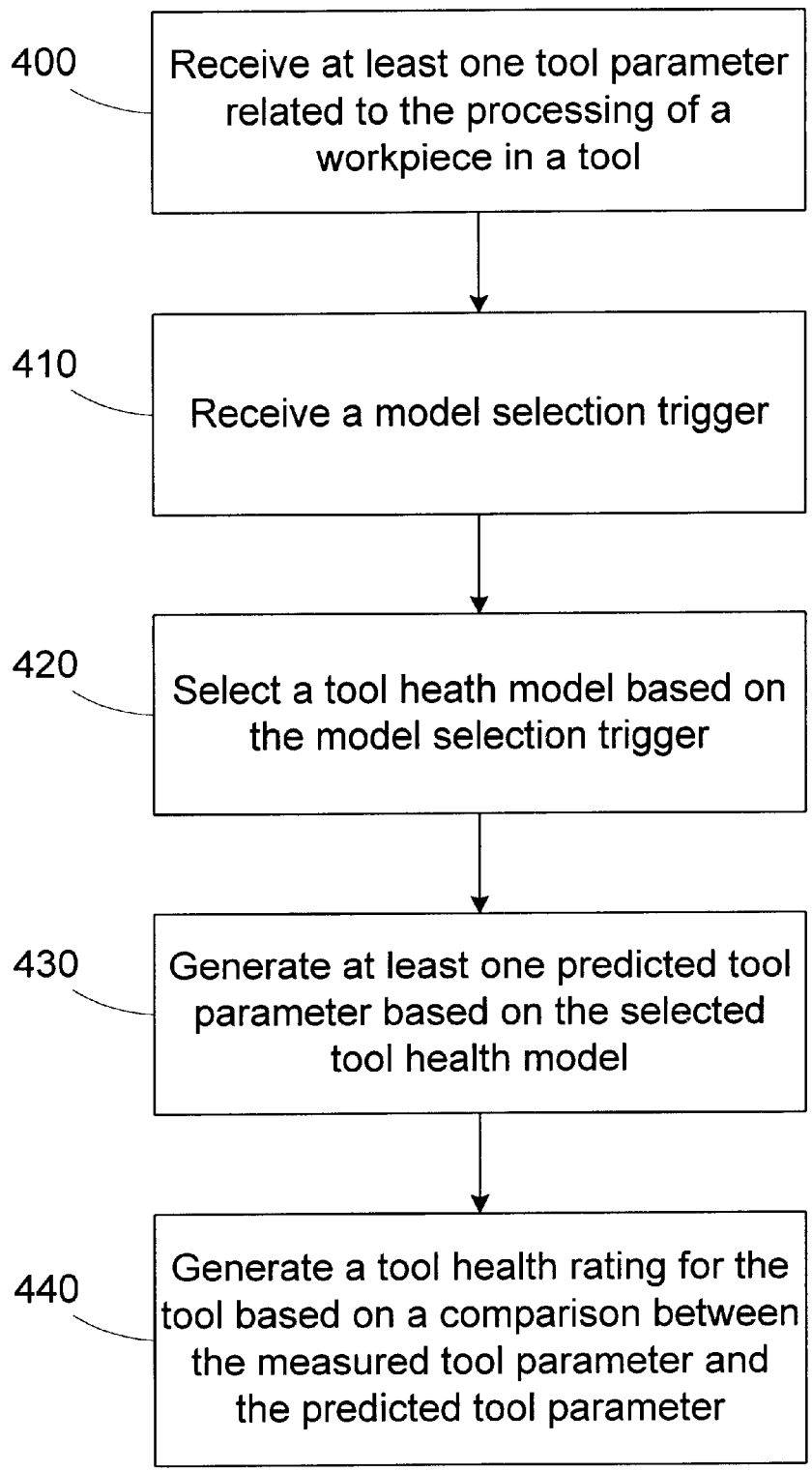
FIG. 4 is a simplified flow diagram of a method for monitoring the health of a tool in accordance with another illustrative embodiment of the present invention.

Referring to FIG. 4, a simplified flow diagram of a method for monitoring the health of a tool in accordance with another illustrative embodiment of the present invention is provided. In block 400, at least one tool parameter related to the processing of a workpiece in a tool is received. In block 410, a model selection trigger is received. In block 420, a tool health model is selected based on the model selection trigger. In block 430, at least one predicted tool parameter is generated based on the selected tool health model. In block 440, a tool health rating is generated for the tool based on a comparison between the measured tool parameter and the predicted tool parameter.

Adaptively selecting tool health models 330 based on the internal and external model selection triggers increases the accuracy of the tool health monitor 90 in judging the health of the RTP tool 100. Such flexibility also allows various tool health models 330 with varying degrees of precision to be employed. For example, if a poor tool health rating is indicated for a particular processing run, the model selector 320 may select a more precise tool health model 330 to confirm or rule out the degraded condition. A more precise tool health model 330 may also be useful in diagnosing the problem with the RTP tool 100 and recommending a corrective action.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for monitoring health of a tool, comprising:
   receiving at least one measured tool parameter related to the processing of a workpiece in a tool;
   receiving a model selection trigger;
   selecting a tool health model based on the model selection trigger;
   generating at least one predicted tool parameter based on the selected tool health model and the measured tool parameter; and
   generating a tool health rating for the tool based on a comparison between the measured tool parameter and the predicted tool parameter.

2. The method of claim 1, wherein receiving the model selection trigger further comprises receiving an external model selection trigger.

3. The method of claim 2, wherein receiving the external model selection trigger further comprises receiving a maintenance event trigger associated with the performance of a maintenance event on the tool.

4. The method of claim 2, wherein receiving the external model selection trigger further comprises receiving a control event trigger associated with an automatic change to an operating recipe parameter of the tool.

5. The method of claim 2, wherein receiving the external model selection trigger further comprises receiving an operator trigger.

6. The method of claim 2, wherein the tool includes an external sensor, and receiving the external model selection trigger further comprises receiving an external sensor trigger based on a measurement recorded by the external sensor.

7. The method of claim 1, wherein receiving the model selection trigger further comprises receiving an internal model selection trigger.

8. The method of claim 7, wherein receiving the internal model selection trigger further comprises receiving a model age trigger.

9. The method of claim 7, wherein receiving the internal model selection trigger further comprises receiving a workpiece count trigger associated with the number of workpieces processed in the tool.

10. The method of claim 7, wherein receiving the internal model selection trigger further comprises receiving a tool parameter trigger based on the value of the tool parameter.

11. The method of claim 7, wherein receiving the internal model selection trigger further comprises receiving a tool setup trigger.

12. The method of claim 1, further comprising identifying a degraded tool condition in response to the tool health rating being less than a predetermined threshold.

13. The method of claim 11, wherein the tool health model comprises a first tool health model, the tool health rating comprises a first tool health rating, and the method further comprises:
    selecting a second tool health model in response to identifying the degraded tool condition; and
    generating a second tool health rating based on the second tool health model and the measured tool parameter.

14. The method of claim 13, wherein selecting the second tool health model further comprises selecting the second tool health model having a higher precision than the first tool health model.

15. The method of claim 1, wherein selecting the tool health model further comprises selecting the tool health model from a library of tool health models.

16. The method of claim 15, wherein the tool is adapted to process the workpiece in accordance with a base operating recipe, and the library of tool health models is associated with the base operating recipe.

17. The method of claim 15, wherein the tool is adapted to process the workpiece in accordance with one of a plurality of base operating recipes, and the library of tool health models includes subsets of tool health models, each subset being associated with a particular one of the base operating recipes.

18. A manufacturing system, comprising:
    a tool adapted to process a workpiece; and
    a tool health monitor adapted to receive at least one tool parameter related to the processing of a workpiece in the tool, receive a model selection trigger, select a tool health model based on the model selection trigger, generate at least one predicted tool parameter based on the selected tool health model and the measured tool parameter, and generate a tool health rating for the tool based on a comparison between the received tool parameter and the predicted tool parameter.

19. The system of claim 18, wherein the model selection trigger comprises an external model selection trigger.

20. The system of claim 19, wherein the external model selection trigger comprises a maintenance event trigger associated with the performance of a maintenance event on the tool.

21. The system of claim 19, wherein the external model selection trigger comprises control event trigger associated with an automatic change to an operating recipe parameter of the tool.

22. The system of claim 19, wherein the external model selection trigger comprises an operator trigger.

23. The system of claim 19, wherein the tool includes an external sensor, and the external model selection trigger comprises an external sensor trigger based on a measurement recorded by the external sensor.

24. The system of claim 18, wherein the model selection trigger comprises an internal model selection trigger.

25. The system of claim 24, wherein the internal model selection trigger comprises a model age trigger.

26. The system of claim 24, wherein the internal model selection trigger comprises a workpiece count trigger associated with the number of workpieces processed in the tool.

27. The system of claim 24, wherein the internal model selection trigger comprises a tool parameter trigger based on the value of the tool parameter.

28. The system of claim 24, wherein the internal model selection trigger comprises a tool setup trigger.

29. The system of claim 18, wherein the tool health monitor is further adapted to identify a degraded tool condition in response to the tool health rating being less than a predetermined threshold.

30. The system of claim 28, wherein the tool health model comprises a first tool health model, the tool health rating comprises a first tool health rating, and the tool health monitor is further adapted to select a second tool health model in response to identifying the degraded tool condition and generate a second tool health rating based on the second tool health model and the measured tool parameter.

31. The system of claim 30, wherein the second tool health model has a higher precision than the first tool health model.

32. The system of claim 28, further comprising a library of tool health models, wherein the tool health monitor is adapted to select the tool health model from the library.

33. The system of claim 32, wherein the tool is adapted to process the workpiece in accordance with a base operating recipe, and the library of tool health models is associated with the base operating recipe.

34. The system of claim 32, wherein the tool is adapted to process the workpiece in accordance with one of a plurality of base operating recipes, and the library of tool health models includes subsets of tool health models, each subset being associated with a particular one of the base operating recipes.

35. A tool health monitor, comprising:
    a library of tool health models;
    a model selector adapted to receive a model selection trigger and select at least one of the tool health models based on the model selection trigger; and
    a fault detection and classification unit adapted to receive at least one tool parameter related to the processing of a workpiece in a tool, generate at least one predicted tool parameter based on the selected tool health model and the received tool parameter, and generate a tool health rating for the tool based on a comparison between the received tool parameter and the predicted tool parameter.

36. The tool health monitor of claim 35, wherein the model selection trigger comprises an external model selection trigger.

37. The tool health monitor of claim 36, wherein the external model selection trigger comprises a maintenance event trigger associated with the performance of a maintenance event on the tool.

38. The tool health monitor of claim 36, wherein the external model selection trigger comprises control event trigger associated with an automatic change to an operating recipe parameter of the tool.

39. The tool health monitor of claim 36, wherein the external model selection trigger comprises an operator trigger.

40. The tool health monitor of claim 36, wherein the tool includes an external sensor, and the external model selection trigger comprises an external sensor trigger based on a measurement recorded by the external sensor.

41. The tool health monitor of claim 35, wherein the model selection trigger comprises an internal model selection trigger.

42. The tool health monitor of claim 41, wherein the internal model selection trigger comprises a model age trigger.

43. The tool health monitor of claim 41, wherein the internal model selection trigger comprises a workpiece count trigger associated with the number of workpieces processed in the tool.

44. The tool health monitor of claim 41, wherein the internal model selection trigger comprises a tool parameter trigger based on the value of the tool parameter.

45. The tool health monitor of claim 41, wherein the internal model selection trigger comprises a tool setup trigger.

46. The tool health monitor of claim 35, wherein the fault detection and classification unit is further adapted to identify a degraded tool condition in response to the tool health rating being less than a predetermined threshold.

47. The tool health monitor of claim 35, wherein the tool health model comprises a first tool health model, the tool health rating comprises a first tool health rating, the model selector is further adapted to select a second tool health model in response to identifying the degraded tool condition, and the fault detection and classification unit is further adapted to generate a second tool health rating based on the second tool health model and the received tool parameter.

48. The tool health monitor of claim 47, wherein the second tool health model has a higher precision than the first tool health model.

49. The tool health monitor of claim 35, wherein the tool is adapted to process the workpiece in accordance with a base operating recipe, and the library of tool health models is associated with the base operating recipe.

50. The tool health monitor of claim 35, wherein the tool is adapted to process the workpiece in accordance with one of a plurality of base operating recipes, and the library of tool health models includes subsets of tool health models, each subset being associated with a particular one of the base operating recipes.

51. A manufacturing system, comprising:
means for receiving at least one tool parameter related to the processing of a workpiece in a tool;
means for receiving a model selection trigger;
means for selecting a tool health model based on the model selection trigger and the received tool parameter;
means for generating at least one predicted tool parameter based on the selected tool health model; and
means for generating a tool health rating for the tool based on a comparison between the measured tool parameter and the predicted tool parameter.

* * * * *